United States Patent [19]

Komatsu et al.

[11] Patent Number: 5,214,009

[45] Date of Patent: May 25, 1993

[54] SIALON CONTAINING CERAMIC SINTER

[75] Inventors: Michiyasu Komatsu; Tsuneji Kameda; Masahiro Asayama, all of Yokohama, Japan

[73] Assignee: Kabushiki Kaisha Toshiba, Kawasaki, Japan

[21] Appl. No.: 525,781

[22] Filed: May 21, 1990

[30] Foreign Application Priority Data

May 22, 1989 [JP] Japan .................................. 1-128037
Jun. 1, 1989 [JP] Japan .................................. 1-137455

[51] Int. Cl.$^5$ ...................... C04B 35/56; C04B 35/58
[52] U.S. Cl. .......................... 501/98; 501/92; 501/96; 501/97
[58] Field of Search .................. 501/96, 97, 98, 92

[56] References Cited

U.S. PATENT DOCUMENTS

| | | | |
|---|---|---|---|
| 4,547,470 | 10/1985 | Tanase et al. | 501/87 |
| 4,745,091 | 5/1988 | Landingham | 501/87 |
| 4,814,581 | 3/1989 | Nunogaki et al. | 219/270 |
| 4,818,635 | 4/1989 | Ekström et al. | 428/698 |
| 4,880,755 | 11/1989 | Mehrotra et al. | 501/96 |
| 4,881,950 | 11/1989 | Bhat et al. | 51/307 |
| 4,902,653 | 2/1990 | Komatsu et al. | 501/97 |
| 4,923,829 | 5/1990 | Yasutomi et al. | 501/95 |

FOREIGN PATENT DOCUMENTS

| | | |
|---|---|---|
| 0095129 | 11/1983 | European Pat. Off. . |
| 3414979 | 10/1984 | Fed. Rep. of Germany . |
| 3734274 | 4/1988 | Fed. Rep. of Germany . |

OTHER PUBLICATIONS

Chemical Abstracts, "*Abrasion-resistant Sialon-based Ceramics*", Jun. 1985, vol. 102, No. 22, Abstract No. 189759t.

David Richerson "Modern Ceramic Engineering" pp. 136–137 1982.

*Primary Examiner*—Mark L. Bell
*Assistant Examiner*—Alan Wright
*Attorney, Agent, or Firm*—Foley & Lardner

[57] ABSTRACT

A ceramic sinter whose mother phase substantially satisfies a sialon composition. This sialon containing ceramic sinter contains at least one kind of compound selected from the group of oxides, carbides, nitrides, and silicides of hafnium, niobium, or titanium in the range of from 0.2 to 40 weight %. The compound of hafnium, niobium, or titanium is present independently in the mother phase in particle-dispersive form. The dispersed particles contribute to improving the mechanical strength, fracture toughness, and heat impact resistance because the sinter body is reinforced by dispersion. The sialon containing ceramic sinter is so excellent in high-temperature properties that it is suitable for use in high-temperature structural materials. Further, a β-type sialon containing ceramic sinter made by forming and firing a ternary material powder of silicon nitride, aluminum oxide, and hafnium compound not only is excellent in improved effects but also has an ample freedom in shaping because a slip casting method can be applied.

20 Claims, No Drawings

SIALON CONTAINING CERAMIC SINTER

FIELD OF THE INVENTION AND RELATED ART STATEMENT

This invention relates to a sialon containing ceramic sinter with improved mechanical strength, fracture toughness, and heat impact resistance.

Because of small thermal expansion coefficient and excellent resistance to heat, oxidation, and corrosion, sialon containing ceramic sinters whose main composition is Si-Al-O-N are used on a trial basis for structural materials, together with sintered materials such as $Si_3N_4$ and SiC. Less subject to degradation in mechanical strength at high temperatures compared to the $Si_3N_4$ sinters and the like, the sialon containing ceramic sinters have gained reputation as a high-strength, thermal resistant material and high-temperature, corrosion resistant material for engine parts and furnace materials.

Two kinds of sialon are known. One is a $\beta$-type sialon, a solid solution, in which part of Si and N of $\beta$-type $Si_3N_4$ is substituted by Al and O, respectively. The other is an $\alpha$-type sialon, an interstitial solid solution, in which metal such as Li or Y is infiltrated into space lattice in an Si-N unit lattice. These types of sialon are produced by the following methods.

In a $\beta$-type sialon sinter the initial material is a mixture of powders such as $Si_3N_4$-AlN-$Al_2O_3$, $Si_3N_4$-AlN-$SiO_2$, $Si_3N_4$-AlN-$Al_2O_3$-$SiO_2$ each contained in a predetermined amount. In an $\alpha$-type sialon sinter the initial material is a mixture of powders such as $Si_3N_4$-AlN-$Y_2O_3$ each contained in a predetermined amount. The mixture is subjected to a press forming method and the like to prepare a formed body. Then, the formed body is subjected to a normal pressure sintering or atmospheric pressure sintering under an inert gas ambient to obtain a sinter.

Since the sialon containing sinter has a higher sinterability than the $Si_3N_4$ sinter, a sinter of high density can be obtained by the normal pressure sintering or atmospheric pressure sintering in the inert gas ambient. It is highly oxidation- and corrosion-resistant and its mechanical strength undergoes few degradation even at high temperatures in excess of 1200° C. However, it is true that the absolute value itself of the mechanical strength of sialon containing sinters produced by normal pressure sintering or atmospheric pressure sintering is inferior to that of the $Si_3N_4$ and SiC sinters and that the fracture toughness and heat impact resistance are not yet satisfactory, either.

For this reason, attempts have been made to improve these properties of the sialon containing sinter by, e.g., the following methods. The sinter is reinforced by adding textured substances such as ceramic whisker. Rare-earth oxides are added and subjected to a liquid phase sintering to densify the sinter.

However, the addition of the ceramic whisker may, depending on the kind, impair sinterability due to its poor affinity with, e.g., $\beta$-type sialon and deteriorates the density of the sinter obtained, thereby providing no satisfactory improvements in strength, heat impact resistance, and the like. Also, the addition of rare-earth oxides and the like has presented the problem of reducing the oxidation resistance and the high temperature properties such as mechanical strength at high temperatures.

Although a hot press method produces relatively dense and mechanically strong sinters, there is a limit in the shape which can be obtained by this method. This, as a result, entails high costs without providing the benefit which could otherwise be provided by its comparatively high sinterability.

Further, as described above, aluminum nitride is usually used as a kind of initial material for producing the $\beta$-type sialon containing sinter. Since aluminum nitride is unstable in water, a slip casting method cannot be used as a method of preparing the formed body, which imposes another problem. This gets in the way to current attempts being made to fabricate structural materials of relatively large size and complicated shape with ceramic sinters.

OBJECT AND SUMMARY OF THE INVENTION

Therefore, a first object of the present invention is to provide a dense sialon containing ceramic sinter, particularly a ceramic sinter adapted for application to high-temperature structural materials, whose mechanical strength, fracture toughness, and heat impact resistance are improved and which can be obtained also by normal pressure sintering or atmospheric pressure sintering.

A second object of the present invention is to provide a dense $\beta$-type sialon containing ceramic sinter to which a forming method using water as a dispersing medium such as a slip casting method can be applied, whose mechanical strength, fracture toughness, and heat impact resistance are improved, and which can be obtained also by normal pressure sintering or atmospheric pressure sintering.

To achieve the first object, the ceramic sinter for application to high-temperature structural materials according to the present invention is a ceramic sinter whose mother phase satisfies a sialon composition. This ceramic sinter contains at least one kind of compound selected from the group of oxides, carbides, nitrides, and silicides of hafnium, niobium, or titanium in the range of 0.2 to 40 weight %. Also, a sialon containing ceramic sinter, whose mother phase satisfies the sialon composition and which contains a hafnium oxide as a dispersive phase component in the range of from 0.2 to 40 weight %, is suitable for use not only in structures but also in other applications.

To achieve the second object, the ceramic sinter according to the present invention is produced by subjecting to a forming and firing process a mixture of ceramic powders containing from 3 to 25 weight % of aluminum oxide and from 0.2 to 40 weight % of at least one kind of compound selected from the group of oxides, carbides, nitrides, and silicides of hafnium, and the remainder being substantially silicon nitride.

The ceramic sinter according to the present invention is such that its mother phase generally satisfies the $\alpha$-type sialon composition and contains at least one kind of compound (hereinafter referred to as "compound of Hf, Nb, or Ti") in the mother phase selected from the group of oxides, carbides, nitrides, and silicides of Hf, Nb, or Ti.

A ceramic that satisfies the composition of $\beta$-type sialon constituting the mother phase of the ceramic sinter according to the present invention is expressed as follows in general form.

$$Si_{6-z}Al_zO_zN_{8-z} \quad (I)$$

where z is a positive number between 0 and 4.2.

Such a ceramic sinter can be obtained by using either a mixture of ceramic powders in which each of Si₃N₄-AlN-Al₂O₃, Si₃N₄-AlN-SiO₂, Si₃N₄-AlN-Al₂O₃-SiO₂, and the like is mixed at a predetermined mole fraction so that the above formula (I) can be satisfied, or a commercially available synthetic β-type sialon powder.

A ceramic that satisfies the composition of the α-type sialon is expressed as follows in general form.

$$M_x(Si, Al)_{12}(O, N)_{16} \qquad (II)$$

where M is one or more kinds of element selected from the group of Y, Ca, Mg, and rare earth elements, and x is a positive number between 0 and 2.

Such a ceramic sinter can be obtained by using either a mixture of ceramic powders in which each of Si₃N₄-AlN-Y₂O₃, Si₃N₄-AlN-CaO, and the like are mixed at a predetermined mole fraction so that the above formula (II) can be satisfied, or a commercially available synthetic α-type sialon powder.

However, the ceramic sinter according to the present invention provides the due advantages as long as the mother phase generally satisfies the sialon composition. Thus, it is not necessarily required that material powders for obtaining the mother phase strictly satisfy the sialon composition.

The ceramic sinter according to the present invention can be obtained by using as a material powder either the above-described ceramic powder satisfying the α- or β-type sialon composition, or a mixture of a ceramic powder from which a mother phase generally satisfying the sialon phase can be obtained and a powder of compound of Hf, Nb, or Ti.

The above-described oxides, carbides, nitrides, and silicides of Hf, Nb, or Ti do not form a solid solution in the sialon grains even after the firing process has been completed, but stays in dispersed particles independently in the structure of the mother phase, forming a dispersed phase. Hence, the sialon containing ceramic sinter according to the present invention is reinforced by the dispersed particles, thereby contributing to improving the mechanical strength and fracture toughness. Among the compounds of Hf, Nb, or Ti, Hf oxides are advantageous because of their high stability.

A suitable initial material of the compound of Hf, Nb, or Ti includes fine particles of 2 μm in average diameter or smaller or, preferably, 1 μm or smaller. The particles are mixed with the ceramic powder satisfying the α- or β-type sialon composition within a range of from 0.2 to 40 weight %. If the compound of Hf, Nb, or Ti is contained less than 0.2 weight %, the advantages of the present invention will not be obtained satisfactorily. Its content in excess of 40 weight % will, on the other hand, degrade the sinterability of sialon, thereby deteriorating the strength of the obtained ceramic sinter. An addition of 0.5 to 20 weight % is therefore more preferable.

As described above, the material powder of the ceramic sinter according to the present invention does not necessarily strictly satisfy the sialon composition. Any material powder may be employed as long as it can provide a sinter whose mother phase generally satisfies the sialon composition; or in other words, the mother phase of the sinter has the same crystal structure as Si₃N₄. The use of a ternary powder composed of silicon nitrides; aluminum oxides; and at least one kind of compound selected from the group of oxides, carbides, nitrides, and silicides of hafnium (including these compounds made by heating) (hereinafter referred to as the "Hf compound"), among others, will provide the advantages to be described later.

In making the ceramic sinter from the ternary material powder in which silicon nitride is the main component, either kind of silicon nitride, α-phase type or β-phase type, may be used. However, one with 80% of α-phase type is more preferable. It is desired to adjust the component ratios of aluminum oxide and Hf compound so that the component ratio of silicon nitride will be 75 weight % or greater.

Aluminum oxide functions as a sintering accelerator, and the most of it forms a solid solution in silicon nitride after the sintering process has been completed. The mixture of too large an amount of aluminum oxide will decrease the mechanical strength and heat impact resistance, while too small an amount will impair sinterability. Thus, its content should be within from 3 to 25 weight % or, preferably, from 5 to 17.5 weight %.

Further, the Hf compound also functions as a sintering accelerator while suppressing the grain growth of the sinter mother body during firing, and it is present independently within the sinter mother body in particle-dispersive state after the sintering process has been completed thereby to reinforce the ceramic sinter with dispersed particles. Particularly, Hf oxides, among the Hf compounds, are advantageous because of their high stability.

The mixing ratio of the Hf compound is in the range of from 0.2 to 40 weight % or, preferably, within the range of from 0.5 to 20 weight %. If the mixing ratio of Hf compound is less than 0.2 weight %, neither the advantage of accelerating the sintering process is satisfactory nor can the above-described advantage of reinforcement with dispersed particles adequately be obtained. If the mixing ratio is more than 40 weight %, no additional advantages will be provided, but rather there is a risk of deteriorating the strength of the ceramic sinter mother body itself. A suitable initial material size of the Hf compound is 2 μm in average or smaller, or, preferably, 1 μm or smaller in fine particles. Accordingly, the use of powder in fine particles allows the sinter to be reinforced by dispersion more effectively.

The mother phase of the above ceramic sinter composed of the ternary material powder generally forms a β-type sialon phase (the same crystal structure as that of β-Si₃N₄). Here, aluminum oxide functions as the sintering accelerator for silicon nitride and improves sinter density, and it contributes to the growth of the β-type sialon. However, when aluminum oxide is used alone, it must be added in large amounts to densify the sinter, and this in turn increases a phase (phase X) that is produced as a by-product, thereby resulting in decreasing the mechanical properties of the sinter such as mechanical strength and fracture toughness. By contrast thereto, the present invention uses a Hf compound to prepare the material powder. Since the Hf compound also functions as a sintering accelerator while suppressing the grain growth of the sinter mother body, the mixing amount of aluminum oxide can be reduced, thereby successfully suppressing the production of the phase X. The Hf compound does not form a solid solution in the β-type sialon phase after having been sintered but stays in dispersive form independently in the β-type sialon composition, thereby reinforcing the sialon containing ceramic sinter by dispersion.

Therefore, the sialon containing ceramic sinter made of the above ternary material powder is a sinter whose mechanical strength, fracture toughness, and heat impact resistance are further improved because the β-type sialon phase which is dense and whose grain size is small is reinforced by dispersing the Hf compound; i.e., the Hf compound is present in particle-dispersive form. This provides greater improvements in properties than the synthetic β-type sialon powder or the mixture of the conventional β-type sialon material powder and the Hf compound, in that the grains are further atomized or the like. Since it is only aluminum oxide that is used to form the β-type sialon phase, it is possible to use water as a dispersing medium.

The ceramic sinter according to the present invention can be produced by, e.g., the following method.

As described previously, a material powder is formed into a predetermined shape by a known method such as a press forming method and the slip casting method. Then, the formed body is fired at a temperature of from 1750° to 1900° C. in an inert gas ambient. Although the firing by the normal pressure sintering or the atmospheric pressure sintering can produce a ceramic sinter which is dense and excellent in mechanical strength and fracture toughness, the present invention is not limited thereto, but a hot press forming or hot isostatic hydrostatic sintering method (HIP) may be applied as well.

DETAILED DESCRIPTION OF THE PREFERRED EMBODIMENTS

The present invention will now be described by reference to embodiments.

Embodiment 1 and Comparative Example 1

A material powder was prepared by mixing 96 weight % of a synthetic β-type sialon powder SZ-2 (trademark, manufactured by Ube Kosan Industries, Ltd.) represented by the following formula (III) and 4 weight % of HfO$_2$ powder of 0.9 μm in average particle diameter in a plastic ball mill for about 12 hours.

$$Si_4Al_2O_2N_6 \quad (III)$$

Then, an organic binder was added by about 5 parts by weight to 100 parts by weight of the above powder, and a plate of 50 mm in length, 50 mm in width, and 7 mm in thickness was formed under a forming pressure of about 1000 kg/cm$^2$. The formed body was degreased in a nitrogen gas ambient and then subjected to the normal pressure sintering at 1800° C. for 2 hours in the nitrogen gas ambient to prepare a ceramic sinter having the β-type sialon as the mother phase.

Using the ceramic sinter thus prepared, the transverse pressure resistance and the fracture toughness K$_{IC}$ were measured, respectively, at ambient temperature and 1300° C. The transverse pressure resistance was measured by a four-point bending strength test under the conditions: a sample size of 4 mm×3 mm×50 mm; a cross head speed of 0.5 mm/min.; an upper span of 10 mm; and a lower span of 30 mm. The temperature-based measurement was made four times per temperature, and the result is shown by the average of the four measurements. The fracture toughness was measured by a micro-indentation method. These results are shown in Table 1.

Example 1 in the table is provided for purposes of comparison with an embodiment of the present invention. The ceramic sinter of Example 1 was prepared by using only the synthetic β-type sialon powder under the same condition as in Embodiment 1; the HfO$_2$ powder was not used.

TABLE 1

|  |  | Embodiment 1 | Example 1 |
|---|---|---|---|
| Transverse pressure resistance (kg/mm$^2$) | Ambient temperature | 75 | 45 |
|  | 1300° C. | 80 | 47 |
| Fracture toughness K$_{IC}$ (MN/m$^{3/2}$) |  | 5.0 | 3.0 |

As is apparent from the results shown in Table 1, the ceramic sinter according to the embodiment of the present invention is excellent in mechanical strength at ambient temperature, not subject to deterioration in mechanical strength at high temperatures, and satisfactory in fracture toughness. Therefore, it can be said that Embodiment 1 has excellent properties as a high-temperature structural material.

Also, observing the microstructure of the ceramic sinter according to Embodiment 1 by a transmission electron microscope (TEM), it was verified that HfO$_2$ particles of less than 2 μm are present independently in the β-type sialon grain boundary of about 5 μm in average diameter.

Embodiments 2 to 5 and Example 2

Material powders were prepared by using the synthetic β-type sialon powder and the HfO$_2$ powder used in Embodiment 1 and mixing them at the ratios shown in Table 2, respectively. Ceramic sinters each having the β-type sialon as the mother phase were prepared under the same condition as in Embodiment 1 using these material powders.

The transverse pressure resistance and fracture toughness K$_{IC}$ of these β-type sialon containing sinters were measured, respectively, as was the case with Embodiment 1. The results of the measurement are also shown in Table 2.

TABLE 2

|  |  | Embodiment |  |  |  | Example |
|---|---|---|---|---|---|---|
|  |  | 2 | 3 | 4 | 5 | 2 |
| Composition ratio (weight %) | β sialon | 99.5 | 97.5 | 95 | 92.5 | 99.9 |
|  | HfO$_2$ | 0.5 | 2.5 | 5.0 | 2.5 | 0.1 |
| Transverse pressure resistance (kg/mm$^2$) | Ambient temperature | 60 | 72 | 80 | 65 | 52 |
|  | 1300° C. | 65 | 75 | 80 | 60 | 56 |
| Fracture toughness K$_{IC}$ (MN/m$^{3/2}$) |  | 4.0 | 4.2 | 5.6 | 5.2 | 3.3 |

Embodiments 6 to 10

Powders of Si$_3$N$_4$ of 0.7 μm in average diameter, of AlN of 0.8 μm in average diameter, and of Al$_2$O$_3$ of 0.9 μm in average diameter were mixed in the composition ratios shown in Table 3, respectively. Then, the HfO$_2$ powder used in Embodiment 1 was added to each of the obtained mixtures of ceramic powders at the mixing ratios shown in Table 3, respectively, to prepare material powders. Using these material powders, ceramic sinters each having the β-type sialon as the mother phase were prepared under the same condition as in Embodiment 1.

The transverse pressure resistance and fracture toughness of these ceramic sinters were measured in the manner similar to that in Embodiment 1. The results are also shown in Table 3.

TABLE 3

| | | | Embodiment | | | | |
|---|---|---|---|---|---|---|---|
| | | | 6 | 7 | 8 | 9 | 10 |
| SIALON | Composition Mole % | $Si_3N_4$ | 71.4 | 71.4 | 50.0 | 50.0 | 50.0 |
| | | $Al_2O_3$ | 14.3 | 14.3 | 25.0 | 25.0 | 25.0 |
| | | AlN | 14.3 | 14.3 | 25.0 | 25.0 | 25.0 |
| | value of z | | 1 | 1 | 2 | 2 | 2 |
| | Mixing ratio (wt. %) | | 97.5 | 96 | 99.5 | 97.5 | 96 |
| Mixing ratio of $HfO_2$ (wt. %) | | | 2.5 | 4 | 0.5 | 2.5 | 4 |
| Transverse pressure resistance ($kg/mm^2$) | Ambient temperature | | 75 | 87 | 63 | 75 | 85 |
| | 1300° C. | | 75 | 80 | 65 | 79 | 82 |
| Fracture toughness $K_{IC}$ ($MN/m^{3/2}$) | | | 5.5 | 6.0 | 4.2 | 5.3 | 6.1 |

Embodiments 11 to 18

Powders of HfC of 0.9 μm in average diameter, HfN of 1.0 μm in average diameter, $HfSi_2$ of 1.0 μm in average particle diameter, $TiO_2$ of 0.7 μm in average particle diameter, TiC of 0.9 μm in average particle diameter, NbC of 0.8 μm in average particle diameter, and $Nb_2O_5$ of 0.7 μm in average particle diameter were added to the synthetic β-type sialon powder used in Embodiment 1 in the ratios shown in Table 4, respectively. Using the material powders thus obtained, ceramic sinters each having the β-type sialon as the mother phase were prepared under the same condition as in Embodiment 1.

The transverse pressure resistance and fracture toughness of these ceramic sinters were measured in the manner similar to that in Embodiment 1. The results are also shown in Table 4.

TABLE 4

| | | Embodiment | | | | | | | |
|---|---|---|---|---|---|---|---|---|---|
| | | 11 | 12 | 13 | 14 | 15 | 16 | 17 | 18 |
| Composition (weight %) | β sialon | 96 | 98 | 96 | 96 | 95 | 96 | 96 | 96 |
| | $HfO_2$ | — | — | — | — | — | — | 2 | 2 |
| | HfC | 4 | — | — | — | — | — | — | — |
| | HfN | — | 2 | — | — | — | — | — | — |
| | $HfSi_2$ | — | — | 4 | — | — | — | — | — |
| | TiC | — | — | — | 4 | — | — | — | — |
| | $TiO_2$ | — | — | — | — | — | — | 2 | — |
| | $Nb_2O_5$ | — | — | — | — | — | 4 | — | — |
| | NbC | — | — | — | — | 5 | — | — | — |
| Transverse pressure resistance ($kg/mm^2$) | Ambient temperature | 85 | 75 | 80 | 74 | 77 | 79 | 83 | 82 |
| | 1300° C. | 83 | 74 | 78 | 70 | 75 | 72 | 80 | 80 |
| Fracture toughness $K_{IC}$ ($MN/m^{3/2}$) | | 5.7 | 5.0 | 5.5 | 5.1 | 5.3 | 5.5 | 5.6 | 5.6 |

Embodiments 19 to 22 and Example 3

Material powders were prepared by mixing at the ratios shown in Table 5, respectively, both a powder of α-type sialon, which is obtained by mixing 63.0 mole % of $Si_3N_4$ powder whose average particle diameter is 0.7 μm, 33.3 mole % of AlN powder whose average particle diameter is 0.8 μm, and 3.7 mole % of $Y_2O_3$ powder whose average particle diameter is 0.9 μm and represented by the following formula (IV), and the $HfO_2$ powder used in Embodiment 1. Ceramic sinters were made by using these material powders under the same condition as in Embodiment 1.

$$Y_{0.4}(Si, Al)_{12}(O, N)_{16} \quad (IV)$$

Using the ceramic sinters thus obtained, the transverse pressure resistance and fracture toughness measured in the manner similar to that in Embodiment 1. The results are also shown in Table 5.

Example 3 in the table is a ceramic sinter made only by the above-described synthetic α-type sialon powder.

TABLE 5

| | | Embodiment | | | | Example |
|---|---|---|---|---|---|---|
| | | 19 | 20 | 21 | 22 | 3 |
| Composition ratio (weight %) | α sialon | 99.5 | 98 | 96 | 92.5 | 100 |
| | $HfO_2$ | 0.5 | 2 | 4 | 7.5 | — |
| Transverse pressure resistance ($kg/mm^2$) | Ambient temperature | 75 | 95 | 90 | 80 | 67 |
| | 1300° C. | 60 | 90 | 85 | 70 | 59 |
| Fracture toughness $K_{IC}$ ($MN/m^{3/2}$) | | 4.3 | 6.5 | 6.2 | 5.8 | 4.2 |

As in apparent from the above embodiments, in the ceramic sinter according to the present invention having sialon as a mother phase, an oxide, carbide, nitride, silicide, or the like of Hf, Nb, or Ti is present in the crystal structure of the mother phase in particle-dispersive form. As a result, the dispersed particles contribute to reinforcing the sinter by dispersion, thereby improving the mechanical strength at ambient temperature, and the mechanical strength and fracture toughness at high temperatures. Thus, the ceramic sinter according to the present invention makes a material excellent in corrosion resistance and strength (at high temperatures), and is most suitable for application to high-temperature structural materials.

Embodiment 23 and Example 4

Material powders were prepared by mixing 85 weight % of $Si_3N_4$ powder of 0.8 μm in average particle diameter including about 90% of α-phase type $Si_3N_4$, 10 weight % of $Al_2O_3$ powder of 0.6 μm in average particle diameter, and 5 weight % of $HfO_2$ powder of 1.0 μm in average particle diameter using ethanol as a dispersing medium by a ball mill for 24 hours.

Then, an organic binder was added by a predetermined amount to 100 parts by weight of each of the above material powders and plates each being 50 mm in length, 50 mm in width, and 7 mm in thickness were formed under a forming pressure of about 1000 kg/cm². The formed bodies were degreased after heating to 700° C. in a nitrogen gas ambient, and then subjected to the normal pressure sintering in the nitrogen gas ambient at 1800° C. for 4 hours to prepare ceramic sinters.

When the crystal phase of these ceramic sinters thus obtained was evaluated by X-ray diffraction, the mother phase was the β-type sialon phase. From an observation of the microstructure using the TEM, it was verified that the $HfO_2$ particles of less than about 2 μm in average particle diameter were present independently in the grain boundary of the β-type sialon of about 5 μm in average particle diameter.

The relative density and transverse pressure resistance, fracture toughness $K_{IC}$, and critical heat impact temperature difference at ambient temperature and at 1300° C. were measured for each of these ceramic sinters. The results are shown in Table 6.

The transverse pressure resistance and fracture toughness were measured in a method similar to that in Embodiment 1, while the critical heat impact temperature difference was measured by a water submersion method.

Example 4 in the table is presented for purposes of comparison with the embodiment of the present invention. The ceramic sinter of Example 4 was prepared under the same condition as in Embodiment 1 using the mixture of 90 weight % of $Si_3N_4$ powder and 10 weight % of $Al_2O_3$ used in Embodiment 23 as the initial material.

TABLE 6

|  | Embodiment 23 | Example 4 |
| --- | --- | --- |
| Relative density (%) | 99.0 | 96.7 |
| Transverse pressure resistance (kg/mm$^2$) Ambient temperature | 90 | 49 |
| Transverse pressure resistance (kg/mm$^2$) 1300° C. | 92 | 55 |
| Fracture toughness $K_{IC}$ (MN/m$^{3/2}$) | 6.5 | 3.9 |
| Critical heat impact temperature difference (°C.) | 900 | 500 |

Embodiments 24 to 32 and Examples 5 to 7

Material powders were prepared by mixing the $Si_3N_4$, $Al_2O_3$, and $HfO_2$ powders used in Embodiment 23 at the ratios shown in Table 7, respectively. Ceramic sinters were then made by using these material powders under the same condition as in Embodiment 23.

Each example in the table is a ceramic sinter made under the same condition as in Embodiment 23; no $HfO_2$ powder was used.

The relative density, transverse pressure resistance, fracture toughness $K_{IC}$, and critical heat impact temperature difference were measured for each of the ceramic sinters. The results are also shown in Table 7.

Embodiments 33 to 39 and Example 8

Material powders were prepared by adding the $Al_2O_3$ powder and $HfO_2$ powder used in Embodiment 23, HfC powder of 1.2 μm in average particle diameter, HfN powder of 1.0 μm in average particle diameter, $HfSi_2$ powder of 1.0 μm in average particle diameter to the $Si_3N_4$ powder used in Embodiment 23 at the ratios shown in Table 8, respectively. Then, ceramic sinters were made by using these material powders under the same condition as in Embodiment 23. Tests similar to those in Embodiment 23 were conducted on these ceramic sinters. The results are also shown in Table 8.

TABLE 8

|  |  | Embodiment | | | | | | | Example |
| --- | --- | --- | --- | --- | --- | --- | --- | --- | --- |
|  |  | 33 | 34 | 35 | 36 | 37 | 38 | 39 | 8 |
| Composition (weight %) | $Si_3N_4$ | 85 | 85 | 85 | 85 | 85 | 84.5 | 85 | 95 |
|  | $Al_2O_3$ | 10 | 10 | 10 | 10 | 10 | 15 | 7.5 |  |
|  | Hf compound | HfC 5 | HfN 5 | $HfSi_2$ 5 | $HfO_2$ 2.5 HfC 2.5 | HfC 2.5 $HfSi_2$ 2.5 | HfC 0.5 | HfC 7.5 | HfC 5 |
| Relative density (%) |  | 99.1 | 98.8 | 99.3 | 99.2 | 99.3 | 98.4 | 99.0 | 92.6 |
| Transverse pressure resistance (kg/mm$^2$) | Ambient temperature | 92 | 88 | 90 | 95 | 94 | 82 | 90 | 40 |
|  | 1300° C. | 96 | 92 | 94 | 100 | 96 | 87 | 92 | 36 |
| Fracture toughness $K_{IC}$ (MN/m$^{3/2}$) |  | 6.4 | 6.2 | 6.4 | 6.5 | 6.5 | 6.0 | 6.0 | 4.0 |
| Critical heat impact temperature difference (°C.) |  | 900 | 875 | 900 | 900 | 900 | 850 | 900 | 600 |

Embodiment 40 and Example 9

A slurry was made by adding appropriate amounts of organic binder and water to 100 parts by weight of the powder material prepared in Embodiment 23. Then, this slurry was charged into a plaster mold of 50 mm × 50 mm × 7 mm and discharged after a predetermined time had elapsed to make a formed body. This formed body was subjected to a degreasing process and a firing process under the same condition as in Embodiment 23 to obtain a ceramic sinter.

For comparison, another ceramic sinter was made by preparing a material powder by mixing 83 weight % of the $Si_3N_4$ powder and 12 weight % of $Al_2O_3$ powder both used in Embodiment 23 and 5 weight % of AlN powder, and by subjecting the prepared material powder to the forming, degreasing, and firing processes under the same condition as in Embodiment 40.

The ceramic sinter of Embodiment 40 exhibited the properties (mechanical strength, fracture toughness, and the like) substantially equal to those of the ceramic sinter of Embodiment 23. The ceramic sinter of Exam-

TABLE 7

|  |  | Embodiment | | | | | | | | | Example | | |
| --- | --- | --- | --- | --- | --- | --- | --- | --- | --- | --- | --- | --- | --- |
|  |  | 24 | 25 | 26 | 27 | 28 | 29 | 30 | 31 | 32 | 5 | 6 | 7 |
| Composition (weight %) | $Si_3N_4$ | 90 | 90 | 82.5 | 84.5 | 87 | 77.5 | 74.5 | 92.5 | 87.5 | 90 | 85 | 80 |
|  | $Al_2O_3$ | 5 | 7.5 | 10 | 15 | 3 | 20 | 25 | 5 | 7.5 | 5 | 15 | 20 |
|  | $HfO_2$ | 5 | 2.5 | 7.5 | 0.5 | 10 | 2.5 | 0.5 | 2.5 | 5 | — | — | — |
| Relative density (%) |  | 98.7 | 98.9 | 99.2 | 98.6 | 98.0 | 99.8 | 99.4 | 98.5 | 98.8 | 90.0 | 97.5 | 98.5 |
| Transverse pressure resistance (kg/mm$^2$) | Ambient temp. | 91 | 93 | 90 | 80 | 74 | 79 | 75 | 84 | 95 | 31 | 52 | 45 |
|  | 1300° C. | 92 | 98 | 92 | 85 | 80 | 83 | 76 | 88 | 100 | 25 | 58 | 50 |
| Fracture toughness $K_{IC}$ (MN/m$^{3/2}$) |  | 6.5 | 6.4 | 6.6 | 6.2 | 5.8 | 5.4 | 5.0 | 6.0 | 6.7 | 4.0 | 4.4 | 3.7 |
| Critical heat impact temp. difference (°C.) |  | 850 | 925 | 850 | 800 | 775 | 750 | 675 | 850 | 900 | 600 | 525 | 500 | ple 9, on the other hand, had many blowholes of from 50 to 200 μm in size caused by AlN reacting with water and being dissolved to foam during the slurring and forming processes, thereby causing large variations of strength (from 15 to 45 kg/mm$^2$).

As is apparent from the foregoing embodiments, the ceramic sinter composed of a ternary material powder has as the mother phase a β-type sialon phase that is dense and small in grain size, and in this β-type sialon phase the Hf compound stays in particle-dispersive form independently, thereby providing satisfactory sinter reinforcement effects. Further, this, in synergic effects with the properties of the mother body that is dense and small in grain size, contributes to making the ceramic sinter excellent in mechanical strength, fracture toughness, and heat impact resistance. Thus, a material adequately satisfactory in both corrosion resistance and mechanical strength can be obtained. The above ceramic sinter is a material that is obtained by improving the properties of β-type sialon containing ceramic sinter without using aluminum nitride, thereby allowing a forming method such as a slip casting method to be applied with a resultant improvement in freedom of shape.

What is claimed is:

1. A ceramic sinter for use in high-temperature structural materials comprising a primary phase substantially satisfying one of an α-sialon composition, a β-sialon composition and mixtures thereof and hafnium oxide in the range of from 0.2 to 40 weight %, said hafnium oxide being present independently in the primary phase in particle-dispersive form.

2. A ceramic sinter for use in high-temperature structural materials as claimed in claim 1, wherein said ceramic sinter consists essentially of from 0.5 to 40 weight % of hafnium oxide with the balance of the ceramic sinter substantially satisfying said sialon composition.

3. A ceramic sinter for use in high-temperature structural materials as claimed in claim 1, wherein said ceramic sinter consists essentially of from 0.5 to 20 weight % of hafnium oxide with the balance of said ceramic sinter substantially satisfying said sialon composition.

4. A sialon containing ceramic sinter comprising a primary phase substantially satisfying at least one of an α-sialon composition, a β-sialon composition and mixtures thereof and from 0.2 to 40 weight % of hafnium oxide as a dispersive phase component.

5. A ceramic sinter made by forming and firing a mixture of powders containing from 3 to 25 weight % of aluminum oxide, from 0.2 to 40 weight % of hafnium oxide, and the remaining component of said mixture being substantially made of silicon nitride, said aluminum oxide and said silicon nitride being blended to substantially satisfy a β-sialon composition, said β-sialon composition constituting a mother phase in which said hafnium oxide is present independently in particle-dispersive form.

6. A ceramic sinter as claimed in claim 5, wherein the primary phase of said ceramic sinter has a crystal structure of β-Si$_3$N$_4$.

7. A ceramic sinter as claimed in claim 6, wherein the mother phase of said ceramic sinter is generally composed of a β-type sialon phase.

8. A ceramic sinter as claimed claim 6, wherein said hafnium oxide is present independently in the primary phase of said ceramic sinter in particle-dispersive form.

9. A structural engine part, comprising a ceramic sintered material having a primary phase substantially satisfying one of an α-sialon composition, a β-sialon composition and mixtures thereof and from 0.2 to 40 wt. % of a hafnium oxide hafnium oxide being present independently in the primary phase in particle-dispersive form and said sintered material being in the shape of a structural engine part.

10. A structural furnace part, comprising a ceramic sintered material having a primary phase substantially satisfying one of an α-sialon composition, a β-sialon composition and mixtures thereof and from 0.2 to 40 wt. % of hafnium oxide, hafnium oxide being present independently in the primary phase in particle-dispersive form and said sintered material being in the shape of a structural furnace part.

11. A method of forming high-temperature structural member, comprising the steps of:
preparing a ceramic material having a primary phase substantially satisfying one of an α-sialon composition, a β-sialon composition and mixtures thereof and from 0.2 to 40 wt. % of hafnium oxide, hafnium oxide being present independently in the primary phase in particle-dispersive form;
forming said ceramic material into the shape of a structural member; and
sintering said shaped structural member.

12. A method as claimed in claim 11, wherein said forming step is a slip-casing method.

13. A method as claimed in claim 11, wherein said structural member is an engine part.

14. A method as claimed in claim 11, wherein said structural member is a furnace part.

15. A high-temperature structural member, comprising a ceramic sintered material having a primary phase substantially satisfying one of an α-sialon composition, a β-sialon composition and mixtures thereof and having from 0.2 to 40 wt. % of hafnium oxide, hafnium oxide being present independently in the primary phase in particle-dispersive form.

16. A high-temperature structural member as claimed in claim 15, containing from 0.5 to 20 wt. % of hafnium oxide.

17. A method as claimed in claim 11, wherein said ceramic material contains from 0.5 to 20 wt. % of hafnium oxide.

18. A ceramic sinter as claimed in claim 5, wherein said mixture of powders comprises from 0.5 to 20 wt. % of hafnium oxide.

19. A ceramic sinter as claimed in claim 5, wherein said mixture of powders comprises at least 75 wt. % of silicon nitride.

20. A ceramic sinter as claimed in claim 19, wherein said silicon nitride powder comprises at least 80 wt. % α-phase silicon nitride.

* * * * *